Oct. 29, 1929. A. BLONDEL 1,733,718
APPARATUS FOR CONCENTRATING AUDIBLE SIGNALS BY INTERFERENCE
Filed July 24, 1925   2 Sheets-Sheet 1

Inventor
Andre Blondel
By B. Singer, Atty.

Oct. 29, 1929.  A. BLONDEL  1,733,718
APPARATUS FOR CONCENTRATING AUDIBLE SIGNALS BY INTERFERENCE
Filed July 24, 1925   2 Sheets-Sheet 2
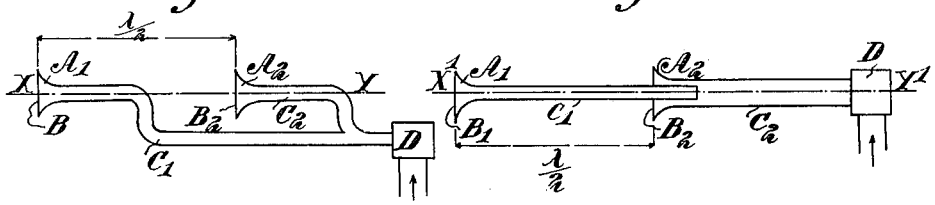

Patented Oct. 29, 1929

1,733,718

UNITED STATES PATENT OFFICE

ANDRÉ BLONDEL, OF PARIS, FRANCE

APPARATUS FOR CONCENTRATING AUDIBLE SIGNALS BY INTERFERENCE

Application filed July 24, 1925, Serial No. 45,869, and in Belgium September 3, 1924.

The object of the present invention is to provide an improved apparatus for concentrating audible signals by interference, based on principles analogous to that of the combination of two sirens formerly indicated by Lord Rayleigh, but much more perfected, in order to concentrate the audible signals about a place (generally the plane of the horizon) or about a given direction.

The method involved in the operation of my improved apparatus consists in employing the sound interference between a certain number of sound emitting devices (such as the horns of a compressed air siren or the vibrating membranes of an electric diaphragm siren, or any other type of emitting device) placed at fixed distances adjusted according to the wave length of the sound waves which they produce, while suitable phases differences, in relation to the spacing between the horns, are caused between the waves emitted by the various devices, so that the interference produced between the waves reduced the energy sent in directions not used for the reception of the sound.

Several cases of application can be considered, according as to whether the centers of all the sound emitting devices are in the same plane or aligned along the same axis. In certain cases, the two solutions can be combined. Examples of these different applications of the apparatus according to the invention are successively explained below.

*1. Sound emitting devices placed along a line in the same plane*

The simplest case will be considered, that of signals directed towards the horizon. The sound waves must have the shape of flattened toruses having as diametrical plane the plane of the horizon. Therefore, $2n+2$ emitting devices ($n$ being an integer) i. e. 4, 6 or 8 etc. devices are superposed vertically one above another with distances between them equal to a half wave length, and they are acted upon so that their respective sound waves concord in phase at the mouths of the emitting devices.

The accompanying drawings are diagrams representing my invention.

Fig. 1 is a diagram of a form of my improved apparatus including a rotary siren and four horns.

Fig. 1ᵃ is a detail elevation of a modified form of the pipes.

Fig. 1ᵇ is a similar view of another modified form of the pipes.

Fig. 2 is a similar view of a modified form of my improved apparatus.

Fig. 2ᵃ is a detail elevation of a modified form of the pipes shown in Fig. 2.

Fig. 5 is a similar view of another form of my improved apparatus in which the emitting devices are grouped in pairs.

Fig. 6 is a similar view of another form of the same.

Fig. 7 is a diagram illustrating a symmetrical arrangement of a cluster of waves.

Fig. 8 is a diagram of another form of my apparatus including four siren horns.

Fig. 9 is a diagram of a form of apparatus illustrating a series of pipes of decreasing areas terminating in single orifices.

Figs. 10, 11, 12 and 13 are diagrams illustrating different arrangements of the emitting devices.

Fig. 14 is a diagram illustrating applications of my method.

Figs. 1, 2, 3 and 4 represent an example of a practical application used in the case of four emitting devices composed of horns supplied with compressed air and placed one above the other at distances equal to a half wave length. The surfaces of the waves produced have the shape of more or less regular toruses and not of planes or cylinders.

Figure 1:
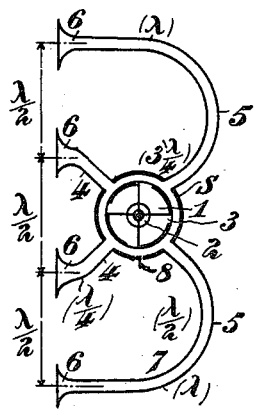

In Fig. 1, the sound producing apparatus is a rotary siren in which the rotor 1, mounted on a shaft 2 supposed to be horizontal, has for example four orifices 3 which during rotation come periodically opposite the inlet adjutages of four pipes 4, 4 and 5, 5, which conduct the air into the four horns 6.

The said pipes need not be all the same length provided that each of them be in resonance i. e. that the outlet orifice be a maximum of oscillations between nodes. However, the pipes may be bent, for example in the shape of a hunting horn, as shown at 4' in Fig. 1ª, so that all will have the same length. Moreover, the pipes may be supplied at the inlets with sound waves of different phases by replacing, for example, the long pipes 5 by shorter pipes 7, as shown in Fig. 1ᵇ, which have a half wave length less, but which have adjutages placed at the middle of the spaces between the adjutages shown by full lines.

Figure 2:
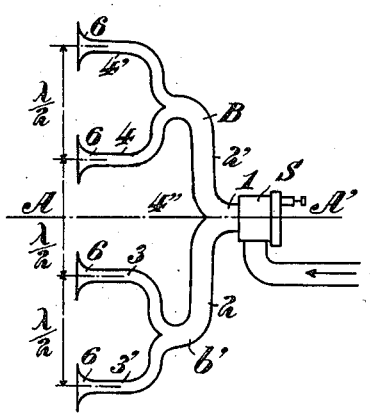

In Fig. 2, S is a siren of any type, either drum or piston, supplying a main pipe 1 which is subdivided into two others 2 and 2' and then into four bent pipes 3, 3' and 4, 4' which end in the horns 6, 6, 6, 6, the axes of the latter being spaced at distances equal to $\frac{\lambda}{2}$, the wave length being $\lambda$. Fig. 2ª shows at 4'' an alternative form for the pipes 4 which are curved individually while having the same acoustic length as above.

Figure 3:
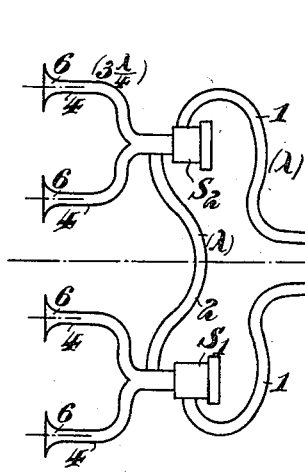
Fig. 3 is a similar view of another form of the same.

In Figure 3, $S^1$ and $S^2$ are two diaphonic type sirens each supplying two of the horns 6, 6 through tubes 4, 4 having a length of three-quarters of a wave length. They both receive compressed air through a pipe 1 provided at the center with an air intake O connected to the compressor by suitable piping.

The two sirens are synchronized by forming a junction between the entrances to their respective pairs of horns by a bent tube 2 having a developed length equal to the length of the second wave.

Figure 4:
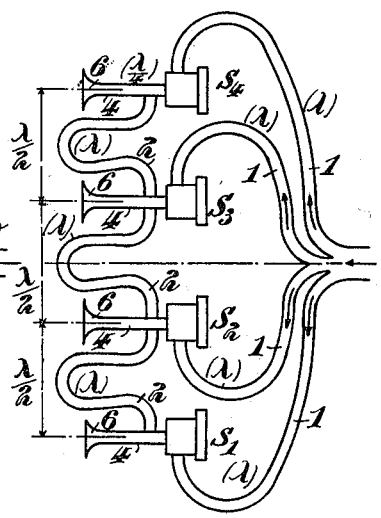
Fig. 4 is a similar view of another form of the same.
Figure 1A:
Figures 1B, 2A:

Fig. 4 shows a form in which each one of the four horns 6 is supplied separately by means of an individual siren. The four sirens $S^1$, $S^2$, $S^3$, $S^4$ are synchronized in pairs by bent tubes 2 each having a length equal to a wave length.

Instead of compressed air sirens, electrically operated diaphragm vibrators may be used in place of the horns represented in the above mentioned figures. The vibrator mechanisms will be supplied in series or in parallel with the same electric current, provided that the diaphragms vibrate synchronously and are spaced at distances equal to a half wave length.

Moreover, other sound emitting devices having the same spacing and also synchronized may be inserted between the above mentioned emitting devices spaced at a half wave length.

*2. Several series of sound emitting devices placed in the same plane and arranged so that each group of five devices includes four at the corners of a square and one at the center of the square.*

The same principle affords a solution of the problem of concentrating sound waves in a single direction. This result can be obtained by placing one or several series of multiple superimposed synchronized sound emitting devices, similar to that represented in Fig. 3, parallel to each other, taking care to leave a space equal to $\frac{\lambda}{2}$ between the series.

The wave concentration is thus produced in the horizontal direction as well as in the vertical direction. Two, three, or four or more of such series can be employed provided that the sound emitted by the devices be always in phase concordance. In general, a number of series equal to the number of emitting devices in one series should be used.

In this case the emitting devices form a set of 16 devices placed in the same plane (Fig. 10) so that each group of five includes four at the corners of an imaginary square and one at the center of the square, characterized by a space equal to a half wave length between the emitting devices along a vertical row or along a horizontal row. The concentration is not produced in the same way in the oblique planes as in the main planes of the set. The cluster of sound waves emitted does not have a square or round section but has projecting points at the four angles.

*3. The use of co-axial emitting devices (having the same axis) arranged in different planes*

An analogous result can be obtained with a smaller number of emitting devices by making use of a property which has been previously demonstrated for grouping wireless antennæ used for producing directed waves (Belgian Patent No. 163,516 of May 27, 1902 and corresponding British Patent No. 11,427 (1903)). The emitting devices are grouped in pairs, each pair having the same axis and the distance between openings being equal a half wave length as shown in Fig. 5. Referring to this figure, D is the siren or sound wave producer, $A^1$ and $A^2$ are the horns from which the sound waves spread. $B^1$, $B^2$ is the plane of the openings; $C^1$ $C^2$ the pipes supplying the horns $A^1$ $A^2$. The horizontal intakes of the pipes $C^1$ and $C^2$ have the common axis X Y. The pipe $C^1$ is bent so as to avoid or suitably pass over the horn $A^2$.

Another arrangement (Fig. 6) may be adopted by causing the pipe $C^1$ to open at a suitable distance into the horn $A^2$ so that the air which reaches the latter through the pipe $C^2$ will divide into two parts, one leaving directly at $B^2$ and the other passing through the pipe $C^1$ so as to leave at $B^1$. In this case, the pipe $C^2$ must have an area approximately double that of the pipe $C^1$. Each group of two horns thus composed and supplied through pipes of lengths such that the difference of phase between $B^1$ and $B^2$ is a half wave length, has the property of emitting no energy towards the zenith, the maximum energy being emitted in the direction of the horizontal axis, but the energy is symmetrically distributed around the said horizontal axis (X Y).

In two such groups (Fig. 5 or Fig. 6) are superimposed with a distance between their axes X Y and X¹ Y¹ equal to a wave length, zones of silence are formed at the horizon in a direction making an angle of 30° with the horizontal axis of the cluster of sound waves measured at a great distance. The longitudinal section of the surface representing the radiated energy is analogous to that represented diagrammatically in Fig. 7, in which Z Z¹ is the direction of the mean horizontal axis of the system.

In order to cause the same phenomena of concentration to be produced in a lateral direction as well as in a vertical direction, it is only necessary to place another group of four emitting devices in a vertical plane at a distance from the first group equal to one wave length. A set of eight horns thus arranged so that each group of five includes four at the corners of a square and one at the center of the square (Fig. 11, projection perpendicular to the axes) gives the same result as the 16 horns shown in Fig. 10.

The surface of the radiated energy is not a surface of revolution about the axis Y and therefore it is not a question here of a cylindrical cluster of waves like that which would be sent out from an emitting device composed of multiple cells grouped in the form of a crown without attention to the space between devices.

A cluster of waves which is symmetrical about an axis (Fig. 7) can be obtained by distributing the individual emitting devices around the said axis not in groups of five such that four are at the corners of a square and the fifth at the center of the square but along one or several concentric circumferences. For example (see Fig. 12) the 16 emitting devices of the case considered previously (Fig. 10) may be placed on two circumferences each including eight devices, so that the latter are grouped by fours on the same diameter. The radius of the first circumference is equal to one-quarter of a wave length, that of the second circumference to three-quarters of a wave length, and others may be added if the radius is increased a half wave length each time.

The same solution can also be adopted for the co-axial coupled emmitting devices as mentioned above, by arranging them (Fig. 13) about an axis parallel to their individual axes, on circumferences the first of which has a radius equal to a half wave length, the succeeding radii being increased each time a distance equal to one wave length.

In general, all the intervals between the emitting devices thus arranged can be filled by adding other emitting devices of suitable phase, in order to add to their effect.

Many other alternatives are possible, only the most important being indicated by way of example.

The invention is characterized by the rational distribution of the emitting devices from the standpoint of their geometric spacing, specified in terms of the wave length, and of the corresponding adjustment of the phases of the emitted waves.

4. A single series of several co-axial emitting devices

The following indicates how it is possible to obtain a cluster of sound waves symmetrical about the common axis by using a small number of co-axial emitting devices.

As an example, Fig. 8 shows four siren horns spaced at distances equal to a half wave length. They are caused to emit waves differing a half-cycle in phase (advancing the phase successively beginning with the left hand horns and proceeding towards the right hand horns), by supplying them through suitable pipes as previously explained. These pipes may be independent and each adjusted to a suitable length, or they may be run through each other with a single common intake according to the principle shown in Fig. 6. The difference in phase between the waves emitted by the successive horns is a half cycle when the entire group is in resonance on the siren.

The arrangement may be generalized and the horns spaced at distances greater or less than a half wave length provided that the differences in phase between the emitted waves be increased or reduced in the same proportion. For example, instead of four horns spaced a half wave length apart, eight horns may be used spaced a quarter wave length apart and emitting sound waves having successively differences in phase of a quarter of a cycle. Each horn will then prevent the sound emitted by the horn immediately in front from returning along the axis, the two sets of waves cancelling each other. This enables cylindrical horns to be employed instead of bell-mouthed horns, the directive effect of which is no longer necessary.

As an example, Fig. 9 shows a whole series of pipes of decreasing areas terminating in single orifices like those of organ pipes. The areas of the various pipes are adjusted so that the sound waves emitted by the different outlet openings have substantially the same amplitude.

The above examples are explained with reference to their application to compressed air sirens. If sirens operating with electric vibrators be used, the difference in phase of the vibrations will be much more easily obtained by supplying the electric circuits of the various diaphragms with currents having suitable relative phase differences. This leads simply to the use of polyphase alternators. For example, in case emitting devices are to be used giving vibrations differing by a quarter of a cycle, they would be supplied with current from the two separate circuits of a two phase alternator, or from two single phase alternators mounted on the same shaft in such a position that the difference in phase between them will be a half cycle, and so on.

In order to obtain vibrations differing by a half cycle, vibrators with armatures polarized by direct current can be used, reversing the direction of the alternating current according to the location of the emitting devices.

*Applications of the method according to the invention to the demarcation of a channel or of a direction*

Let X Y (Fig. 14) be the direction to be indicated. Any one of the systems of concentrating emitting devices described in the present patent (or a similar one) will be used as desired. At the top of a tower or other suitable support (represented by the circle T) two similar systems will be mounted, their respective axes of wave concentration A B, C D being placed so that the angle between them is bisected by the line X Y. Care must be taken that the two surfaces of propagation of the waves (having for example the shape shown in dotted lines) really cut each other along the axis of symmetry X Y.

If the two groups of emitting devices are caused to alternately emit signals of the same power but differing in cadence, the navigator must direct his ship along the direction in which the two sounds appear to be equal. The indication can be made more positive by afterwards emitting periodically a third signal from the two—simultaneously—devices, at the same time impressing on them vibratory movements differing in phase by a half cycle, (by one of the methods set forth above or by any other method); the two sound waves produced will have a resultant giving no sound along the direction O X. Away from the axis O X, the navigator will hear more strongly the emitting set the axis O A or O C of which is the closest to him.

What I claim is:

1. Apparatus for concentrating audible signals by interference, consisting of a plurality of emitting devices placed at geometric intervals equal to a known fraction of the wave length, and the difference in phase of the vibrations of which is so adjusted that the combination of the phases with the said geometric intervals produces such interferences between the waves from the different emitting devices, that these waves annul each other at a long distance in directions where no sound is wanted.

2. Apparatus for the production of sound waves concentrated towards a chosen direction, consisting of a plurality of emitting devices in the same plane perpendicular on said direction at intervals equal to a half wave length, and arranged and constructed for synchronously exciting all the emitting devices in resonance with the frequency of the sound produced, so that each emitting device will be at a point of maximum amplitude of the sound waves that it emits.

3. Apparatus as claimed in claim 1, including means for imparting synchronous vibrations to said emitting devices.

4. Apparatus as claimed in claim 1, including electrically operated means for imparting synchronous vibrations to said emitting devices.

In witness whereof I affix my signature.

ANDRÉ BLONDEL.